C. D. PETTIS.
BRAKE SHOE.
APPLICATION FILED OCT. 25, 1912.
1,065,718.
Patented June 24, 1913.
2 SHEETS—SHEET 1.
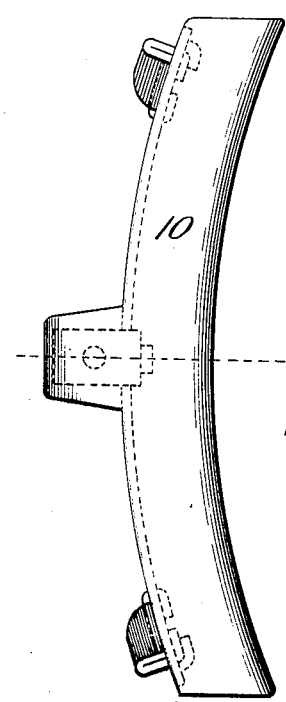
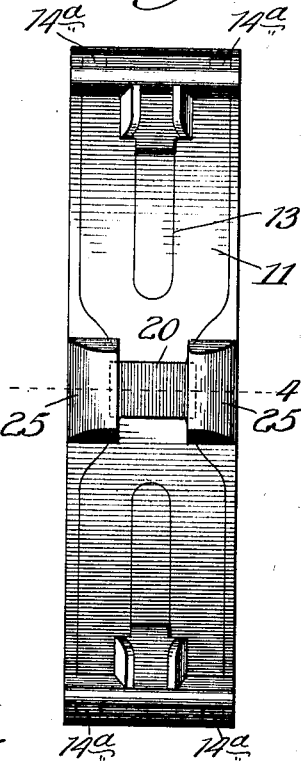
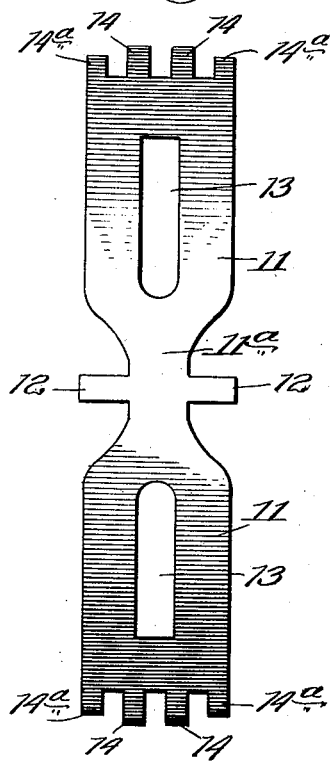
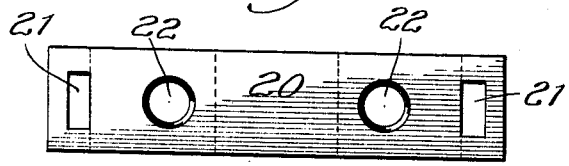
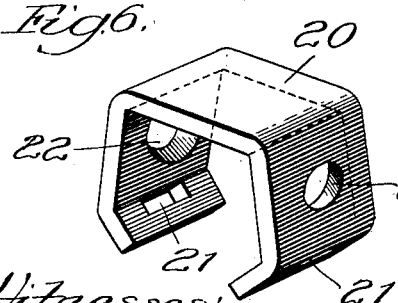
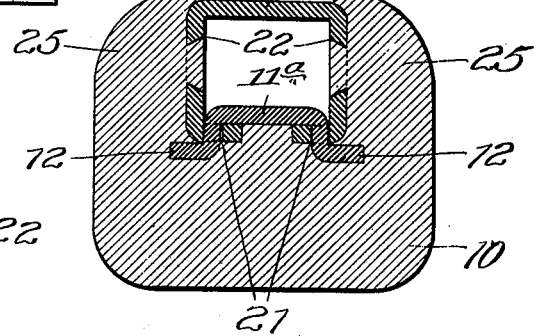

C. D. PETTIS.
BRAKE SHOE.
APPLICATION FILED OCT. 25, 1912.
1,065,718.
Patented June 24, 1913.
2 SHEETS—SHEET 2.
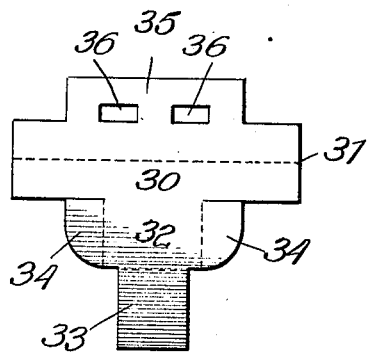
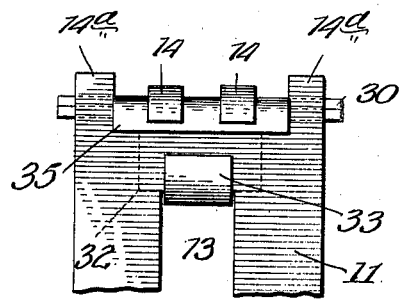
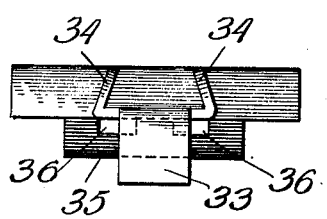
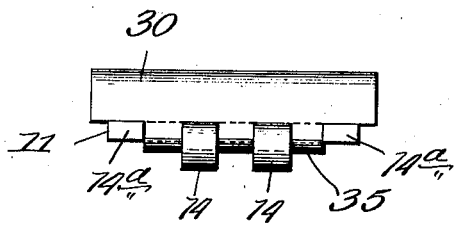
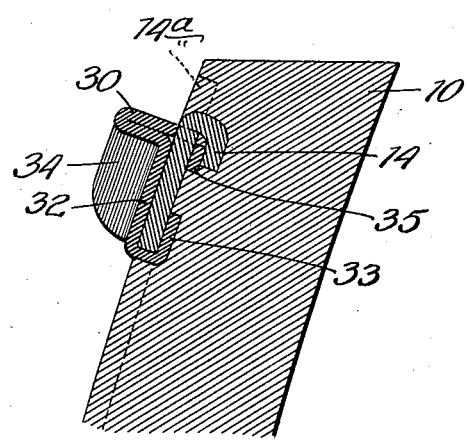
Witnesses:
Inventor:
Clifton D. Pettis

UNITED STATES PATENT OFFICE.

CLIFTON D. PETTIS, OF CHICAGO, ILLINOIS.

BRAKE-SHOE.

1,065,718.

Specification of Letters Patent.

Patented June 24, 1913.

Application filed October 25, 1912. Serial No. 727,806.

*To all whom it may concern:*

Be it known that I, CLIFTON D. PETTIS, a citizen of the United States, and a resident of the city of Chicago, county of Cook, and State of Illinois, have invented certain new and useful Improvements in Brake-Shoes, of which I do declare the following to be a full, clear, and exact description, reference being had to the accompanying drawings, forming part of this specification.

This invention has relation to that class of brake shoes the back portions of which are reinforced or strengthened by means of ductile metal plates or parts and in which provision is made for strengthening the attaching lugs whereby the shoes are connected to the brake heads.

The invention consists in the features of novelty hereinafter described, illustrated in the accompanying drawings and particularly pointed out in the claims at the end of this specification.

Figure 1 is a view in side elevation of a brake shoe embodying my invention. Fig. 2 is a plan view of the shoe. Fig. 3 is a detail plan view of the reinforcing ductile metal back plate. Fig. 4 is a view in cross section on line 4—4 of Fig. 2. Fig. 5 is a detail view of the blank from which the center lug of the shoe will be formed. Fig. 6 is a view of the center lug after it has been bent to shape. Fig. 7 is the blank from which the end lug of the shoe will be formed. Fig. 8 is a detail inner face view of a portion of the back plate after the end lug has been attached thereto. Fig. 9 is a detail view in elevation of one of the end lugs before it has been attached to the back plate. Fig. 10 is a view of one of the end lugs after it has been attached to the back plate. Fig. 11 is a view in vertical, longitudinal section through the end portion of the shoe showing the back plate and end lug in position.

In an application filed by me in the United States Patent Office of even date herewith, Serial No. 727,805, I have disclosed and claimed the broad feature of providing a brake shoe with a reinforcing back of ductile metal and with a ductile metal fastening lug, said reinforcing back having a part projecting therefrom to engage the ductile metal lug. I do not wish to be understood as claiming in the present application the subject-matter set forth and claimed in said above mentioned application. The present application embodies a specific form of center lug and discloses and claims also an end lug that is connected to the ductile metal back by means of a part projecting from said back.

The body 10 of the brake shoe will preferably be formed of cast metal and this cast metal body 10 will be reinforced by a back plate 11 of ductile metal. As shown, this back plate 11 has a centrally reduced portion 11$^a$ from the side edges of which project extending parts or lugs 12 that will be formed at the same time that the metal is cut away to form the reduced portion 11$^a$ of the plate. The reinforcing plate 11 will also be formed with elongated slots 13 and the ends of the plate 11 will be provided with projecting parts 14 and 14$^a$, the purpose of which will presently appear.

The central lug of my improved brake shoe is shown as comprising a channel shaped plate 20 of ductile metal, the lower ends of which are formed with slots 21 adapted to fit over and interlock with the projecting parts 12 of the reinforcing plate 11, and, preferably, the side walls of the lug 20 are formed with openings 22 through which will flow the cast metal walls or abutments 25 that are integral with the cast metal body 10 of the shoe.

As shown, the central lug 20 is formed from a plate or strip such as illustrated in Fig. 5 of the drawings, and, after the strip has been perforated, as there shown, it will be bent to the form illustrated in Fig. 6. The lug bent to the form shown in Fig. 6, with its side walls flaring, will have its lower ends slipped over the laterally projecting parts 12 of the reinforcing plate 11 which will be bent downward for this purpose, after which the ends of the lug will be bent to the completed shape shown in Fig. 4. That is to say, the side walls of the lug will be drawn inwardly until they are approximately parallel and the projecting parts 12, after they have been passed through the slots 21 of the lug 20, will be bent outwardly, as illustrated in Fig. 4. When the center lug 20 has thus been attached to the reinforcing back plate and parts have been set in the mold, (after the attachment of the end lugs in manner to be presently described) the cast metal will be poured into the mold in the usual manner and will flow about and unite with the reinforcing back plate 11 and will flow down around the side walls of the lug 20, filling the perforations 22 and securely interlocking with the lug. It will thus be seen that the ductile metal lug is connected to the back plate in so secure and rigid a manner that all danger of its separation therefrom, under strains incident to usage, is entirely avoided.

The preferred form of ductile metal end lug and its manner of connection to the end of the brake shoe are illustrated more particularly in Sheet 2 of the drawings. This end lug is somewhat similar in construction to the ductile metal end lug set forth in an application Serial No. 711,305, filed by me in the United States Patent Office July 24, 1912. I do not wish to be understood as claiming herein the matter claimed in said application. This end lug comprises a main portion 30 adapted to be folded over the line 31 to form a wall extending transversely of the shoe and comprises also a central, inwardly projecting part 32 having a member 33 extending therefrom and adapted to be bent downwardly to interlock with the back plate of the shoe. From the part 32 project also the side walls 34 adapted to be bent upwardly (see Figs. 9 and 11) to brace the transverse wall formed by the part 30. From the part 30 of the lug extends outwardly the part 35 having slots 36 therein adapted to receive the projecting parts 14 at the ends of the reinforcing back 11 of the shoe.

In attaching the end lug to the end of the reinforcing back 11, the parts of the lug will first be folded to the shape shown in Fig. 9, after which the projecting parts 14 will be passed through the slots 36 and the member 33 will be passed down through the slot 13 of the back plate 11. The ends of the projecting parts 14 will then be bent downwardly and inwardly, as shown in Figs. 8, 10 and 11, and the member 33 will be bent outwardly, so as to securely interlock with the back plate. When the end lugs are thus attached to the end of the back plate (the center lug having been attached to the back plate, as already described) the back plate and lug will be placed in the mold in readiness to have the body of the shoe cast thereon.

It is obvious that the precise details of construction above set out may be varied without departing from the spirit of the invention, and that features of the invention may be employed without its adoption as an entirety. Obviously, it is not essential that there should be two projecting parts 14, nor is it essential in all cases that there should be attaching lugs at both ends of the shoe.

Having thus described my invention, what I claim as new, and desire to secure by Letters Patent, is:—

1. A brake shoe comprising a ductile metal reinforcing back provided with laterally projecting parts and a ductile metal center lug having perforations in its lower end to receive said projecting parts, the ends of said lug being bent and interlocked with said projecting parts.

2. A brake shoe comprising a ductile metal reinforcing back provided with laterally projecting parts and a ductile metal center lug having perforations in its lower end to receive said projecting parts, the ends of said lug being bent and interlocked with said projecting parts and said projecting parts being bent downwardly and laterally.

3. A brake shoe comprising a ductile metal reinforcing back provided with an integral projection at its end narrower than and extending from said back and a ductile metal end lug perforated and through which said projection passes.

4. A brake shoe comprising a ductile metal reinforcing back provided with a projection at its end and a ductile metal end lug, said projection at the end of the back passing through and being bent downwardly about the lower part of said end lug.

5. The combination with the body of a brake shoe, of a ductile metal back provided at its end with a projecting part narrower than said back and a ductile metal end lug formed with a wall to extend transversely of the shoe and with an inwardly projecting, perforated member through which the narrow projecting part at the end of the back passes.

6. The combination with the body of a brake shoe, of a ductile metal back provided at its end with a projecting part and a ductile metal end lug formed with a wall to extend transversely of the shoe and with inwardly extending members at opposite sides of said wall, one of said members being passed through and interlocked with said back and the other of said members having a perforation through which the projection of said back passes.

CLIFTON D. PETTIS.

Witnesses:
Geo. P. Fisher,
Katharine Gerlach.